(12) United States Patent
Pan

(10) Patent No.: US 10,093,259 B2
(45) Date of Patent: Oct. 9, 2018

(54) PROTECTION DEVICE OF SELF-PROPELLED VEHICLE

(71) Applicant: Kinpo Electronics, Inc., New Taipei (TW)

(72) Inventor: Shih-Li Pan, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 261 days.

(21) Appl. No.: 15/095,175

(22) Filed: Apr. 11, 2016

(65) Prior Publication Data

US 2017/0225638 A1  Aug. 10, 2017

(30) Foreign Application Priority Data

Feb. 5, 2016  (TW) .............................. 105104025 A

(51) Int. Cl.
*B60R 19/48* (2006.01)
*B60R 19/02* (2006.01)
*A47L 9/00* (2006.01)

(52) U.S. Cl.
CPC .............. *B60R 19/483* (2013.01); *A47L 9/00* (2013.01); *B60R 19/023* (2013.01); *A47L 2201/04* (2013.01)

(58) Field of Classification Search
CPC ....... B60R 19/023; B60R 19/44; B60R 19/46; B60R 19/483; A47L 13/48; A47L 2201/04
See application file for complete search history.

(56) References Cited

U.S. PATENT DOCUMENTS

| 6,443,509 | B1 * | 9/2002 | Levin .................... | A01D 34/008 200/61.43 |
| 6,902,215 | B1 * | 6/2005 | Condeelis ............. | B60R 19/483 293/102 |
| 6,999,850 | B2 * | 2/2006 | McDonald .............. | A47L 9/009 318/567 |
| 7,389,156 | B2 * | 6/2008 | Ziegler .............. | A22C 17/0013 318/568.1 |
| 8,950,795 | B2 * | 2/2015 | Hickey et al. .......... | B60R 19/48 |
| 9,186,800 | B2 * | 11/2015 | Shin ...................... | B25J 19/0091 |

(Continued)

FOREIGN PATENT DOCUMENTS

| DE | 102008031674 A1 * | 1/2009 | ......... B60R 21/0132 |
| EP | 2730376 | 5/2014 | |

(Continued)

OTHER PUBLICATIONS

"Search Report of European Counterpart Application," dated Jun. 29, 2017, p.1-p.6.

*Primary Examiner* — Jason S Daniels
(74) *Attorney, Agent, or Firm* — JCIPRNET

(57) ABSTRACT

A protection device of self-propelled vehicle including a main body, a frame body, and at least two pivoting members is provided. The main body has a rail or a moving block, and the frame body has a moving block or a rail. The frame body moves on a plane relative to the main body via the moving block being removably coupled to the rail. The two pivoting members being removably pivoted to the main body and the frame body along two normal lines of the plane respectively. The frame body is forced to be rotated on the plane with one of the two pivoting members relative to the main body.

8 Claims, 4 Drawing Sheets

(56) References Cited

U.S. PATENT DOCUMENTS

| | | | |
|---|---|---|---|
| 2004/0135385 A1* | 7/2004 | Murray | B60R 19/44 |
| | | | 293/142 |
| 2005/0021181 A1* | 1/2005 | Kim | A47L 9/009 |
| | | | 700/245 |
| 2007/0016328 A1* | 1/2007 | Ziegler | A47L 5/14 |
| | | | 700/245 |
| 2014/0138964 A1 | 5/2014 | Shin | |
| 2014/0188325 A1 | 7/2014 | Johnson et al. | |
| 2017/0181591 A1* | 6/2017 | Tanaka | A47L 9/2805 |

FOREIGN PATENT DOCUMENTS

| | | |
|---|---|---|
| GB | 2404140 | 1/2005 |
| JP | H07257299 | 10/1995 |
| KR | 20130005513 | 1/2013 |

\* cited by examiner

PROTECTION DEVICE OF SELF-PROPELLED VEHICLE

CROSS-REFERENCE TO RELATED APPLICATION

This application claims the priority benefit of Taiwan application serial no. 105104025, filed on Feb. 5, 2016. The entirety of the above-mentioned patent application is hereby incorporated by reference herein and made a part of this specification.

BACKGROUND

Field

The disclosure relates to a protection device of self-propelled vehicle.

Description of Related Art

In recent years, with the gradual development of robots and related technologies, self-propelled devices are also popular. Unmanned devices, such as automatic guide vehicles (AGV), or floor cleaning (sweeping/mopping) robots, integrated with mobile mechanisms, sensors, and controllers have been vigorously developed.

In general, the self-propelled devices in the aspect of controlling for path tracking and obstacle avoidance is divided into an active type or a passive type. The active type self-propelled devices refer to that the self-propelled devices know obstacles in advance and then plan the route, and the passive type self-propelled devices refer to that the self-propelled devices determine the subsequent driven motion according to the force direction and the position of the collision after meeting the obstacles.

In terms of the passive type, the self-propelled devices are provided with a plurality of sensors in the bumper in the existing technologies. The bumper is forced to be deformed so as to trigger the sensors, and then the passive type self-propelled devices determine according to the signals of the sensors. However, the deformation of the bumper is affected by material and structure strength, and the deformation cannot always be maintained in a certain amount. Thus, even if the bumper is affected by the collision, the case that the sensors may not be (completely) triggered may exist. At the same time, the deformation of the bumper cannot be maintained in a certain amount with the change of the size of the body. Therefore, how to improve the performance of the self-propelled devices in the aspect of controlling for obstacle avoidance is required to be solved by the relevant personnel.

SUMMARY

The disclosure provides a protection device of self-propelled vehicle. The protection device of self-propelled vehicle has a better ability for path tracking and obstacle avoidance.

The disclosure provides a protection device of self-propelled vehicle including a main body, a frame body, and at least two pivoting members. The main body has a rail or a moving block, and the frame body has a moving block or a rail. The frame body moves on a plane relative to the main body via the moving block being removably coupled to the rail. The pivoting members are removably pivoted to the main body and the frame body along normal lines of the plane respectively. The frame body is forced to be rotated on the plane with one of the two pivoting members relative to the main body.

Based on the above, in the protection device of self-propelled vehicle, the frame body and the main body are removably coupled together along a plane, and two pivoting members are removably pivoted to the main body and the frame body along two normal lines of the plane at the same time. Thus, when the frame body is collided with the obstacle, the frame body can generate a relative motion relative to the main body, and particularly the frame body can generate a rotary motion relative to the main body with one of the two pivoting members. Thereby, the basis for determining and the subsequent corresponding treatment in the traveling process that the protection device of self-propelled vehicle is collided with the obstacle are provided. The collision may make the frame body generate the motion relative to the main body more smoothly and clearly via the configuration of the frame body relative to the main body and the pivoting members, so that the deformation of the frame body resulted in incomplete motion which may produce misjudgment can be effectively avoided.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
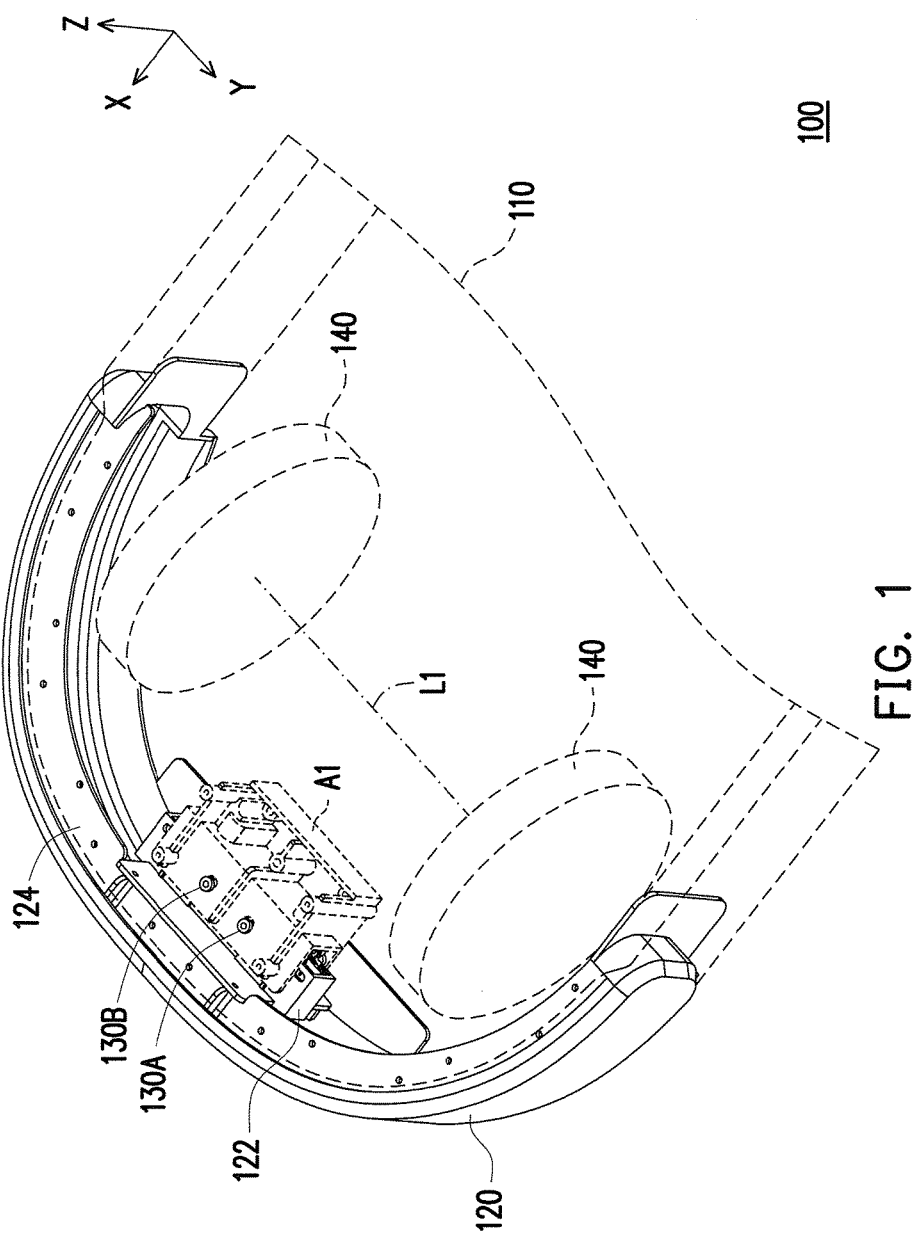
FIG. 1 is a partial schematic view of a protection device of self-propelled vehicle according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
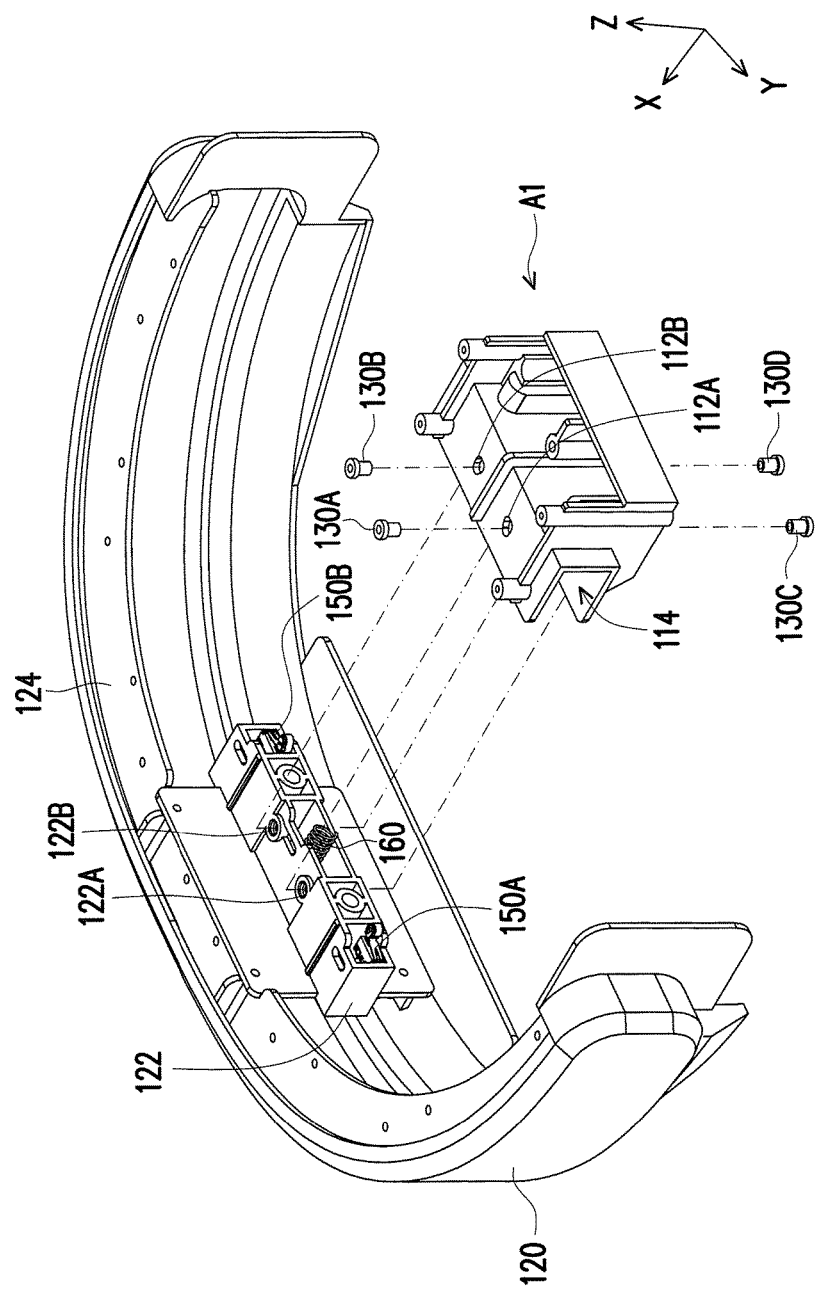
FIG. 2 is a partial schematic component assembly view of the protection device of self-propelled vehicle of FIG. 1.

FIG. 1 is a partial schematic view of a protection device of self-propelled vehicle according to an embodiment of the disclosure. Different parts are distinguished by dashed lines and solid lines here. FIG. 2 is a partial schematic component assembly view of the protection device of self-propelled vehicle of FIG. 1. An X-Y-Z rectangular coordinate is provided at the same time to facilitate the component description. Referring to FIG. 1 and FIG. 2, in the present embodiment, a protection device of self-propelled vehicle 100 includes a main body 110, a frame body 120, pivoting members 130A and 130B (130C and 130D), power wheels 140, and sensors 150A and 150B. The frame body 120 is removably coupled to the main body 110. The power wheels 140 are disposed at the main body 110 so as to be a traveling drive source of the protection device of self-propelled vehicle 100. The sensors 150A and 150B are triggered switches, for example. The sensors 150A and 150B are disposed between the main body 110 and the frame body 120 so as to be triggered when a relative motion is generated between the frame body 120 and the main body 110. Other components which are not described here can be learned from the existing technology, and they are not the main technology of the disclosure and will not be repeated.

As shown in FIG. 1, the frame body 120 is an exterior component of the protection device of self-propelled vehicle 100, and an external surface area of the frame body 120 includes all possible collision range when the protection device of self-propelled vehicle 100 travels along a single direction (e.g., toward a positive X-axis direction) substantially. That is, when the protection device of self-propelled vehicle 100 travels toward the positive X-axis direction, the frame body 120 may actually meet any obstacles on the travel route of the protection device of self-propelled vehicle 100. Further, it can be known that, if there is a frame body disposed at the periphery of the protection device of self-propelled vehicle 100, the frame body of the protection device of self-propelled vehicle 100 may be collided with the obstacles on the travel route in any direction on an X-Y plane.

It should be mentioned that, the main body 110 of the present embodiment has a structural member A1, and the structural member A1 has a rail 114. As shown in FIG. 2, the rail 114 is a lateral dumping U-shaped groove structure, and the frame body 120 has a moving block 122. The frame body 120 can move on the X-Y plane relative to the main body 110 via the exterior contours of the moving block 122 and the rail 114 being coupled with each other. The X-Y plane can be regarded as the plane where the protection device of self-propelled vehicle 100 is traveling. Furthermore, the pivoting members 130A and 130B (130C and 130D) are pivoted to the main body 110 and the frame body 120 along two (four) normal lines direction (i.e., Z-axis) of the X-Y plane respectively.

The objects which the rail 114 and the moving block 122 are disposed is not limited here. That is, in another embodiment (not shown), the moving block may be disposed on the structural member A1 of the main body 110, and the frame body 120 may have the rail. Also, the same relative motion is generated between the main body 110 and the frame body 120 via the moving block and the rail being coupled with each other.

Specifically, the rail 114 with the groove structure has two vias 112A and 112B on each of two opposite sidewalls of the groove structure (only the vias of the upper part of the structural member A1 are shown due to the perspective view). The pivoting members 130A and 130B are locked to the pivoting portions 122A and 122B on the moving block 122 through the vias 112A and 112B (the bottom part of the structural member A1 also has vias to provide for the pivoting members 130C and 130D being through, and thus the pivoting members 130C and 130D are pivoted to the moving block 122). It should be noted that, four pivoting members 130A, 130B, 130C and 130D are shown in FIG. 2. However, the pivoting members 130A and 130C are coaxial (Z-axis) while the pivoting members 130B and 130D are coaxial (Z-axis), and thus it can be considered as only two pivoting axes as a whole. Therefore, the following description will be illustrated according to the pivoting members 130A and 130B and the vias 112A and 112B as an example. That is, the protection device of self-propelled vehicle 100 of the present embodiment belongs to a dual rotary axes structure.

It should be noted that, the vias 112A and 112B are expanded holes respectively, and an expanding range thereof is enough to provide for the pivoting members 130A and 130B moving therein. Therefore, the pivoting members 130A and 130B can still maintain the movement in a certain range on the X-Y plane. Thereby, when the frame body 120 is forced due to the obstacle collision, the frame body 120 is rotated on the X-Y plane relative to the main body 110 with one of the pivoting members 130A and 130B as a rotary center.

Additionally, the frame body 120 further includes a plurality of protruding rib structures 124, which are distributed according to the region occupied by the frame body 120 (on the main body 110) substantially. The protruding rib structures 124 are used to improve the structural strength of the frame body 120, so that the frame body 120 is not deformed when the frame body 120 generates a motion relative to the main body 110. In other words, the protruding rib structures 124 can help to improve the rigidity of the frame body 120, so that the frame body 120 can be regarded as a rigid body in motion.

On the other hand, the aforementioned sensors 150A and 150B are disposed in the moving block 122 corresponding to the pivoting members 130A and 130B respectively, thereby being used to sense the relative motion of the moving block 122 and the rail 114. That is, when the frame body 120 is rotated relative to the main body 110 due to the obstacle collision, the corresponding sensors 150A and 150B are triggered. Thus, a control module (not shown) of the protection device of self-propelled vehicle 100 determines where the position and the force direction is collided according to whether the sensors 150A and 150B are triggered. Additionally, an elastic member 160 is disposed and propped between the moving block 122 and the rail 114 (the bottom plate part of the groove structure), so that the frame body 120 generating the relative motion can be reset after collision.

Figure 3:
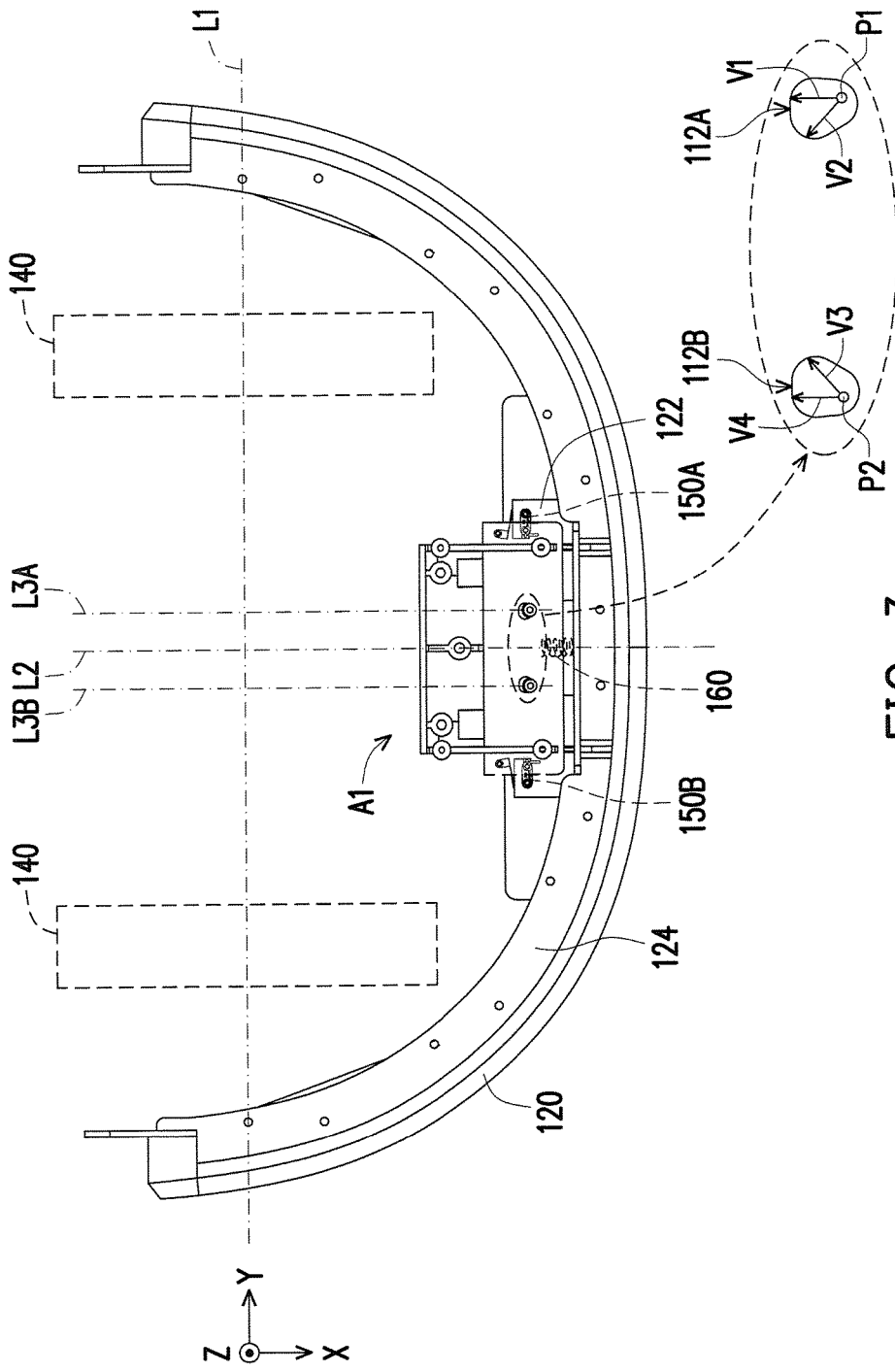
FIG. 3 is a partial top view illustrating the protection device of self-propelled vehicle of FIG. 1.

FIG. 3 is a partial top view illustrating the protection device of self-propelled vehicle of FIG. 1. Referring to FIG. 1 to FIG. 3, a wheel axle L1 of the power wheels 140 and a central axis L2 of the frame body 120 are used as a reference (L1 and L2 are orthogonal to each other) at the same time. In the present embodiment, the moving block 122 and the structural member A1 (rail 114) are substantially located on the central axis L2 and between the wheel-base of the power wheels 140 (i.e., the orthogonal projections of the moving block 122, the rail 114, and the pivoting members 130A and 130B onto the wheel axle L1 are between two power wheels 140).

Therefore, via the centralized configuration, the relative motion that the frame body 120 performs relative to the main body 110 can be improved to be more smooth, and the main body 110 has better space utilization at the same time.

As shown in a partial enlarged view of FIG. 3, pivoting points P1 and P2 represent the positions where the pivoting members 130A and 130B lock attached in the vias 112A and 112B. Thus, it can be known obviously that, each of the pivoting members 130A and 130B have main mobile trends V1, V2 (including the range between the two), V3 and V4 (including the range between the two), wherein the mobile trends V1 and V4 can be regarded as the direction toward the negative X-axis. Therefore, the pivoting points P1 and P2 not only can move toward the negative X-axis direction, but have a relative mobile trend from each other. Thereby, the frame body 120 can be rotationally moved relative to the main body 110. In other words, two pivoting reference axes L3A and L3B can be formed on the main body 110 by the pivoting points P1 and P2 of the present embodiment.

For example, when the left side of the frame body 120 meets the obstacle in FIG. 3, a distance from the collision to the pivoting reference axis L3A is farther. That is, the force arm of the collision relative to that of the right side of the frame body 120 is longer, and thus the movement of the left side of the frame body 120 is more than the movement of the right side of the frame body 120. Therefore, the frame body 120 is rotated (clockwise) with the pivoting point P1 so as to activate the sensor 150B. When the right side of the frame body 120 meets the obstacle in FIG. 3, a distance from the collision to the pivoting reference axis L3B is farther. Thus, the movement of the right side of the frame body 120 is more than the movement of the left side of the frame body 120. Therefore, the frame body 120 is rotated (counterclockwise) with the pivoting point P2 so as to activate the sensor 150A. When the obstacle is collided with the frame body 120 along the central axis L2, the pivoting points P1 and P2 are translated along the negative X-axis direction. At this time, the frame body 120 only has translational motion without rotary motion. It can be known that, the expanding direction of the vias 112A and 112B, which are the expanded holes, can be regarded as including the rotation direction of the frame body 120 relative to the main body 110 on the X-Y plane and including the translation direction without rotation of the frame body 120 relative to the main body 110 on the X-Y plane. Importantly, in the actual operation, the probability that the obstacle collided with the frame body 120 along the central axis L2 is much smaller than the probability that the obstacle collided with the left side or the right side of the frame body 120. Furthermore, since the present embodiment has dual pivoting reference axes L3A and L3B, the frame body 120 may produce pivoting no matter where the frame body 120 is collided. Therefore, the position of the collision can be effectively detected.

Since the aforementioned motion module, in the actual traveling process of the protection device of self-propelled vehicle 100, besides having a low probability that the obstacle is collided with the frame body 120 in the facing direction (i.e., along the central axis L2), there is a higher probability of the collision at the right side or the left side of the frame body 120 (based on the central axis L2). Thus, the configuration of the pivoting members 130A and 130B can cause the frame body 120 to have a rotary motion. At the same time, since the motion module can be carried out smoothly, the coupled structure of the frame body 120 and the main body 110 disposed on the central axis L2 in a centralized manner is required. The centralized manner can be considered to be centralized toward the central axis L2 without over the wheel-base range of the power wheels 140.

Figure 4:
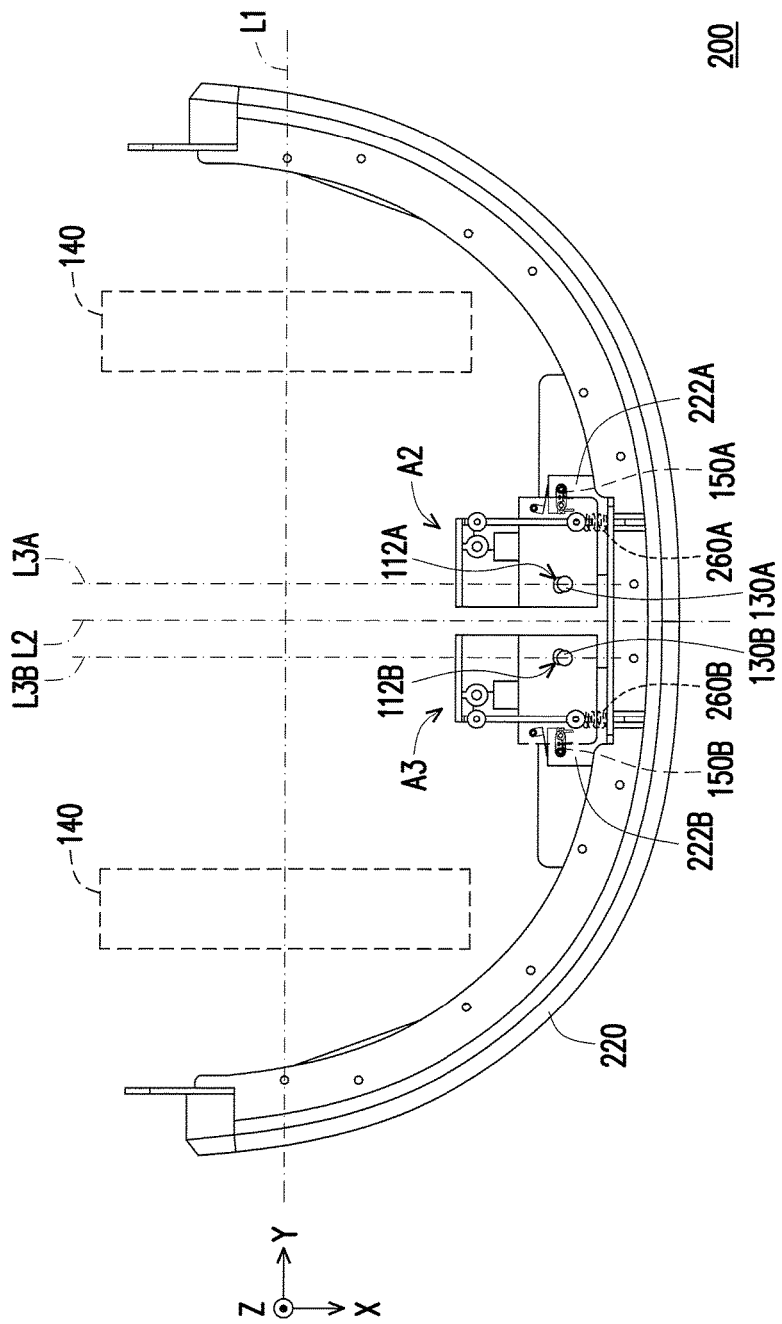
FIG. 4 is a partial top view illustrating a protection device of self-propelled vehicle according to another embodiment of the disclosure.

FIG. 4 is a partial top view illustrating a protection device of self-propelled vehicle according to another embodiment of the disclosure. Referring to FIG. 4 and compared to FIG. 3, the difference is that, the main body of a protection device of self-propelled vehicle 200 includes two structural members A2 and A3 symmetrically disposed along the central axis L2, and each of the structural members A2 and A3 has the rail (similar to the disposition of the structural member A1 and the rail 114 of the aforementioned embodiment). A frame body 220 has two moving blocks 222A and 222B symmetrically disposed along the central axis L2. The moving blocks 222A and 222B are coupled to the rails of the structural members A2 and A3 respectively. The pivoting members 130A and 130B are through the vias 112A and 112B on the structural members A2 and A3 respectively so as to be lock attached to the moving blocks 222A and 222B.

Additionally, a pair of elastic members 260A and 260B corresponding to the moving block 222A and 222B and the rail being coupled respectively are disposed at the protection device of self-propelled vehicle 200 for the reset after the relative motion. The rest of the components which are not described are still the same as the aforementioned embodiment. It can be known that, the moving blocks 222A and 222B and the rail can be appropriately changed according to the actual demand, and the configuration thereof are still the same as the aforementioned embodiment. Thus, the protection device of self-propelled vehicle 200 can achieve the effect of motion as the aforementioned embodiment.

In summary, in the aforementioned embodiments of the disclosure, the protection device of self-propelled vehicle is removably coupled to the main body along the plane by the frame body, and two pivoting members are pivoted to the main body and the frame body. Also, degree of freedom that the two pivoting members moved on the plane can be maintained. Thus, when the frame body is collided with the obstacle, the frame body can smoothly generate the rotary motion or the translational motion relative to the main body. Additionally, via the centralized configuration, the moving blocks, the rail, and the pivoting members are all centralized toward the central axis of the protection device of self-propelled vehicle. Thus, the frame body can generate the motion relative to the main body more smoothly, so as to be the control basis for determining the path tracking and obstacle avoidance by the protection device of self-propelled vehicle in the traveling process.

Furthermore, the pivoting members are through the vias so as to be lock attached to the main body substantially, and the vias have the expanding range in the corresponding direction from each other, thereby effectively providing the effect that the pivoting members have the plane movement in the expanded holes. Thus, the frame body can be rotationally moved relative to the main body with one of the pivoting members used as the rotary center.

Although the disclosure has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A protection device of self-propelled vehicle, comprising:
   a main body having a rail or a moving block;
   a frame body having a moving block or a rail, and the frame body moving on a plane relative to the main body via the moving block being removably coupled to the rail, wherein the main body has the moving block while the frame body has the rail, and the main body has the rail while the frame body has the moving block; and
   at least two pivoting members being removably pivoted to the main body and the frame body along two normal lines of the plane respectively, and the frame body being forced to be rotated on the plane with one of the two pivoting members relative to the main body,
   wherein the rail is a groove structure, the groove structure has two vias on at least one sidewall, the two pivoting members are connected to the moving block through the two vias respectively, the two vias are expanded holes respectively, an expanding direction thereof comprises a rotation direction of the frame body relative to the main body on the plane, and the expanding direction further comprises a translation direction without rotation of the frame body relative to the main body on the plane.

2. The protection device of self-propelled vehicle according to claim 1, wherein the protection device of self-propelled vehicle has a central axis, and the rail and the moving block are located on the central axis.

3. The protection device of self-propelled vehicle according to claim 2, wherein the two pivoting members are symmetrical relative to the central axis.

4. The protection device of self-propelled vehicle according to claim 1, wherein the two vias are located on each of two sidewalls, and the protection device of self-propelled vehicle comprises four pivoting members connected to the moving block through the vias along four normal lines of the plane respectively.

5. The protection device of self-propelled vehicle according to claim 1, further comprising:
 at least two sensors disposed in the moving block, when the frame body is rotated on the plane with one of the two pivoting members relative to the main body, one of the at least two sensors is triggered since structures of the moving block and the main body are moved closer to each other, and when the frame body is translated without rotation on the plane relative to the main body, the at least two sensors are triggered at the same time since the structures of the moving block and the main body are moved closer to each other.

6. The protection device of self-propelled vehicle according to claim 1, wherein the frame body further comprises a plurality of protruding rib structures to improve structural strength of the frame body, and when the frame body is rotated relative to the main body, the frame body is not deformed.

7. The protection device of self-propelled vehicle according to claim 1, further comprising:
 a pair of power wheels disposed at the main body, wherein an interval of the two pivoting members is less than an interval of the pair of power wheels.

8. The protection device of self-propelled vehicle according to claim herein the main body has two separated sub-rails, the frame body has two separated sub-blocks slidably and rotatably coupled to the separated sub-rails respectively, and each of the two pivoting members is pivoted to one sub-rail and one sub-block.

* * * * *